(12) United States Patent
Sharangpani et al.

(10) Patent No.: US 6,611,910 B2
(45) Date of Patent: *Aug. 26, 2003

(54) METHOD FOR PROCESSING BRANCH OPERATIONS

(75) Inventors: Harshvardhan Sharangpani, Santa Clara, CA (US); Tse-Yu Yeh, Milpitas, CA (US); Michael Paul Corwin, Palo Alto, CA (US); Millind Mittal, Palo Alto, CA (US); Kent G. Fielden, Sunnyvale, CA (US); Dale Morris, Steamboat Springs, CO (US); Rajiv Gupta, Los Altos, CA (US); Michael Schlansker, Los Altos, CA (US); Mircea Poplingher, Palo Alto, CA (US)

(73) Assignee: Idea Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 142 days.

(21) Appl. No.: 09/169,868

(22) Filed: Oct. 12, 1998

(65) Prior Publication Data

US 2002/0095566 A1 Jul. 18, 2002

(51) Int. Cl.$^7$ ................................................ G06F 9/30
(52) U.S. Cl. ....................................... 712/237; 709/238
(58) Field of Search ................................. 712/237, 238

(56) References Cited

U.S. PATENT DOCUMENTS

| | | | | |
|---|---|---|---|---|
| 5,568,624 A | * | 10/1996 | Sites et al. | |
| 5,742,804 A | | 4/1998 | Yeh et al. | ................... 712/237 |
| 5,774,685 A | * | 6/1998 | Dubey | |
| 5,778,435 A | * | 7/1998 | Berenbaum et al. | |
| 5,790,823 A | * | 8/1998 | Puzak et al. | |
| 5,857,104 A | * | 1/1999 | Natarjan et al. | |

OTHER PUBLICATIONS

Luk et al., "Complier–Based Prefetching for Recursive Data Structures", ACM, pp. 222–233, Jul. 1996.*
Mowry et al., "Design adn Evaluation of a Compiler Algorithm for Prefetching" ACM, pp. 62–73, Jun. 1992.*
Mahlke et al., "Compiler Synthesized Dynamic Branch Prediction", IEEE, pp. 153–164, 1996.*

* cited by examiner

*Primary Examiner*—Emanuel Todd Voeltz
(74) *Attorney, Agent, or Firm*—Blakely, Sokoloff, Taylor & Zafman LLP

(57) ABSTRACT

A branch operation is processed using a branch predict instruction and an associated branch instruction. The branch predict instruction indicates a predicted direction, a target address, and an instruction address for the associated branch instruction. When the branch predict instruction is detected, the target address is stored at an entry indicated by the associated branch instruction address and a prefetch request is triggered to the target address. The branch predict instruction may also include hint information for managing the storage and use of the branch prediction information.

15 Claims, 7 Drawing Sheets

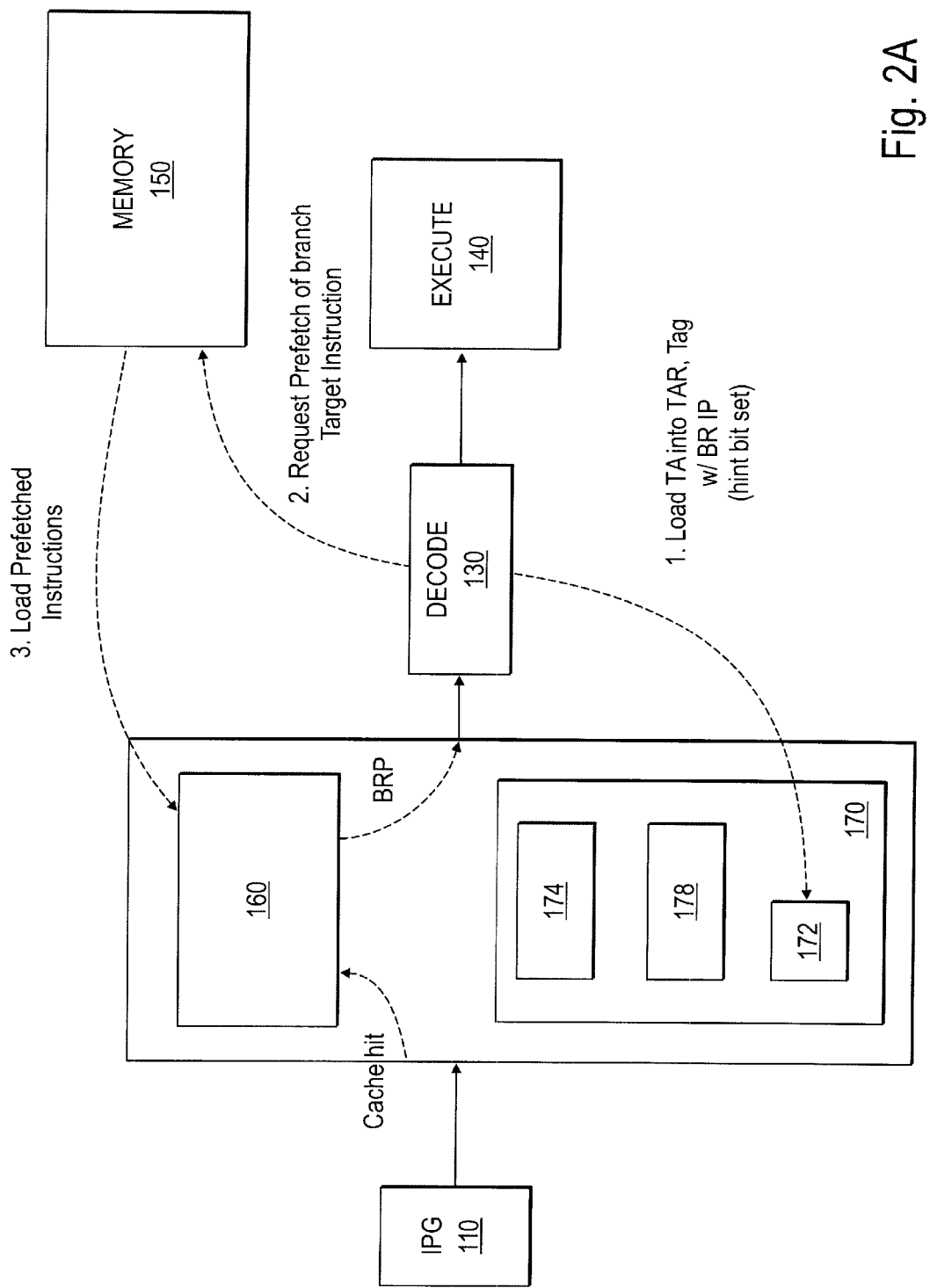

METHOD FOR PROCESSING BRANCH OPERATIONS

BACKGROUND OF THE INVENTION

1. Technical Field

This invention relates to microprocessor architecture, and in particular to methods for processing branch instructions.

2. Background Art

Advanced processors employ pipelining techniques to execute instructions at very high speeds. On such processors, the overall machine is organized as a pipeline consisting of several cascaded stages of hardware. Instruction processing is divided into a sequence of operations, and each operation is performed by hardware in a corresponding pipeline stage ("pipe stage"). Independent operations from several instructions may be processed simultaneously by different pipe stages, increasing the instruction throughput of the pipeline. Where a pipelined processor includes multiple execution resources in each pipe stage, the throughput of the processor can exceed one instruction per clock cycle.

Contemporary superscalar, deeply pipelined processors may have anywhere from 5 to 15 pipe stages and may execute operations from as many as 4 to 8 instruction simultaneously in each pipe stage. In order to make full use of a processor's instruction execution capability, the execution resources of the processor must be provided with sufficient instructions from the correct execution path. This keeps the pipeline filled with instructions that contribute to the forward progress of the program.

The presence of branch instructions poses major challenges to filling the pipeline with instructions from the correct execution path. When a branch instruction is executed and the branch condition met, control flow of the processor is resteered to a new code sequence and the pipeline is refilled with instructions from the new code sequence. Since branch execution occurs in the backend of the pipeline, and instructions are fetched at the front end of the pipeline, several pipe stages worth of instructions may be fetched from the wrong execution path by the time the branch is resolved. These instructions need to be flushed, causing bubbles (idle stages) in the pipeline. The processor then begins fetching instructions at the target address indicated by the branch instruction. The intervening stages of the pipeline remain empty until they are filled by instructions from the new execution path.

To reduce the number of pipeline bubbles, processors incorporate branch prediction modules at the front ends of their pipelines. When a branch instruction enters the front end of the pipeline, the branch prediction module forecasts whether the branch instruction will be taken when it is executed at the back end of the pipeline. If the branch is predicted taken, the branch prediction module communicates a target address to the fetch module at the front end of the pipeline. The fetch module begins fetching instructions at the target address.

Conventional branch prediction modules employ branch target buffers (BTBs) to track the history (target address, branch direction) of branch instructions. Target addresses and branch directions (taken/not taken) are collected in the BTB as the branch instructions are processed. If a branch is resolved taken when it is first encountered, instructions beginning at its branch target address (branch target instructions) may be stored in an instruction cache for the encounter. Dynamic branch prediction algorithms use the stored branch history information to predict branch outcomes on subsequent encounters. Dynamic branch prediction schemes range from relatively simple algorithms, e.g. the predicted outcome is the same as the last outcome, to complex algorithms that require substantial time and resources to execute. When the branch is subsequently encountered, the dynamic branch prediction algorithm predicts the branch direction. If the predicted branch direction is "taken", the branch target address is used to access branch target instructions in the cache, if they have not been displaced.

There are a number of problems with the conventional approach to branch prediction. For example, the BTB typically accumulates branch history/prediction information indiscriminately for all branch instructions that are processed. A relatively large BTB is required to reduce the risk of overwriting branch history information for important branch instructions with information for less important branch instructions (Important branch instructions are those critical to program performance). The greater size of the BTB makes it correspondingly slower, reducing the performance of branch processing operations.

The dynamic branch prediction algorithms employed by the BTB can also impact system performance. More accurate dynamic prediction algorithms tend to be more complex. They require more die area to implement, further increasing the size of the BTB, and they require more time to provide a prediction. Dynamic branch prediction algorithms also make no use of branch information available from the compiler, e.g. static prediction information. This reduces their prediction accuracy for branches that are not encountered frequently, i.e. branches that lack temporal locality. Branch history information for these branches is more likely to be displaced from the BTB before it is used.

Another problem is created by the limited availability of cache space. Target branch instructions saved to a cache for a branch that is resolved taken may be evicted before they are used if the branch is not encountered frequently. Some processors support prefetching to improve the availability of branch target instructions for important branch instructions. A prefetch instruction may be scheduled ahead of the branch instruction. The prefetch instruction triggers the processor to fetch the branch target instructions and return them to an instruction cache. When the branch instruction is subsequently encountered, the branch target instructions can be accessed from the cache using the target address provided by the BTB or the decoder. Provided the prefetch instruction is properly scheduled, it can deliver the branch target instructions to the cache before they are needed. This can improve the speed with which the processor pipeline is resteered, but it does increase traffic on the processor-memory channel, and use of prefetching may be limited for this reason. Prefetching alone also does nothing to reduce the size/speed/accuracy constraints of the BTB.

The present invention addresses these and other problems associated with conventional branch processing systems.

SUMMARY OF THE INVENTION

The present invention supports efficient processing of branch operations by providing early, intelligent branch prediction information to the branch prediction system.

In accordance with the present invention, a branch operation is processed through a branch predict instruction and an associated branch instruction. The branch predict instruction indicates a target address and an instruction address for the associated branch instruction. When the branch predict instruction is detected, the target address is stored at an entry indicated by the associated branch instruction address.

For one embodiment of the invention, the branch predict instruction triggers a prefetch of the branch target instructions into an instruction cache or buffer. When the associated branch instruction is subsequently detected, the target address is read from the entry and instructions indicated by the target address are retrieved from the instruction cache.

The branch predict instruction may also include hint information for managing branch prediction information. For a hierarchical branch prediction system, hint information may indicate in which structure the information is to be stored. Hint information may also indicate whether static or dynamic information is used to predict the branch direction. In the latter case, the hint may trigger the dynamic prediction algorithm, allowing more time for the dynamic prediction algorithm to complete.

BRIEF DESCRIPTION OF THE DRAWINGS

The present invention may be understood with reference to the following drawings, in which like elements are indicated by like numbers. These drawings are provided to illustrate selected embodiments of the present invention and are not intended to limit the scope of the invention.

FIGS. 2A and 2B are block diagrams illustrating the operation of branch predict instructions and branch instructions for another embodiment of the present invention.

DETAILED DISCUSSION OF THE INVENTION

The following discussion sets forth numerous specific details to provide a thorough understanding of the invention. However, those of ordinary skill in the art, having the benefit of this disclosure, will appreciate that the invention may be practiced without these specific details. In addition, various well known methods, procedures, components, and circuits have not been described in detail in order to focus attention on the features of the present invention.

Processors typically encounter one branch instruction for every of five to twelve instructions. A branch instruction is executed to determine the next instruction on the execution path (instruction flow) and to determine any side effects it may have on the architectural state. A conditional branch instruction specifies a target address and a branch condition. The branch condition determines the direction of the branch, i.e. whether the branch is taken or not taken. When the branch instruction is executed, processor control jumps to the instruction at the target address if the branch direction is taken. Processor control falls through to the next instruction if the branch direction is not taken. The target address may be specified by a pointer to a register (indirect branch) or as an offset from the IP of the branch instruction (IP-relative branch). The branch condition may be specified through a variable to which the branch instruction points. The variable is typically stored in a register that is written by compare instructions.

The present invention supports branch operations with early, intelligent branch prediction information tailored to the upcoming instruction sequence. This allows efficient use of branch prediction structures and early initiation of long latency operations associated with the branch (target instruction prefetches, dynamic branch prediction calculations). The branch prediction structures are managed under software control through branch and branch predict instructions. Software control allows branch prediction information for imminent branch instructions to be made available earlier through smaller, faster branch prediction structures. A link between the branch predict instruction and its associated branch instruction allows prediction information to be loaded into these branch prediction structures and accessed on an as-needed basis.

Figure 1A:
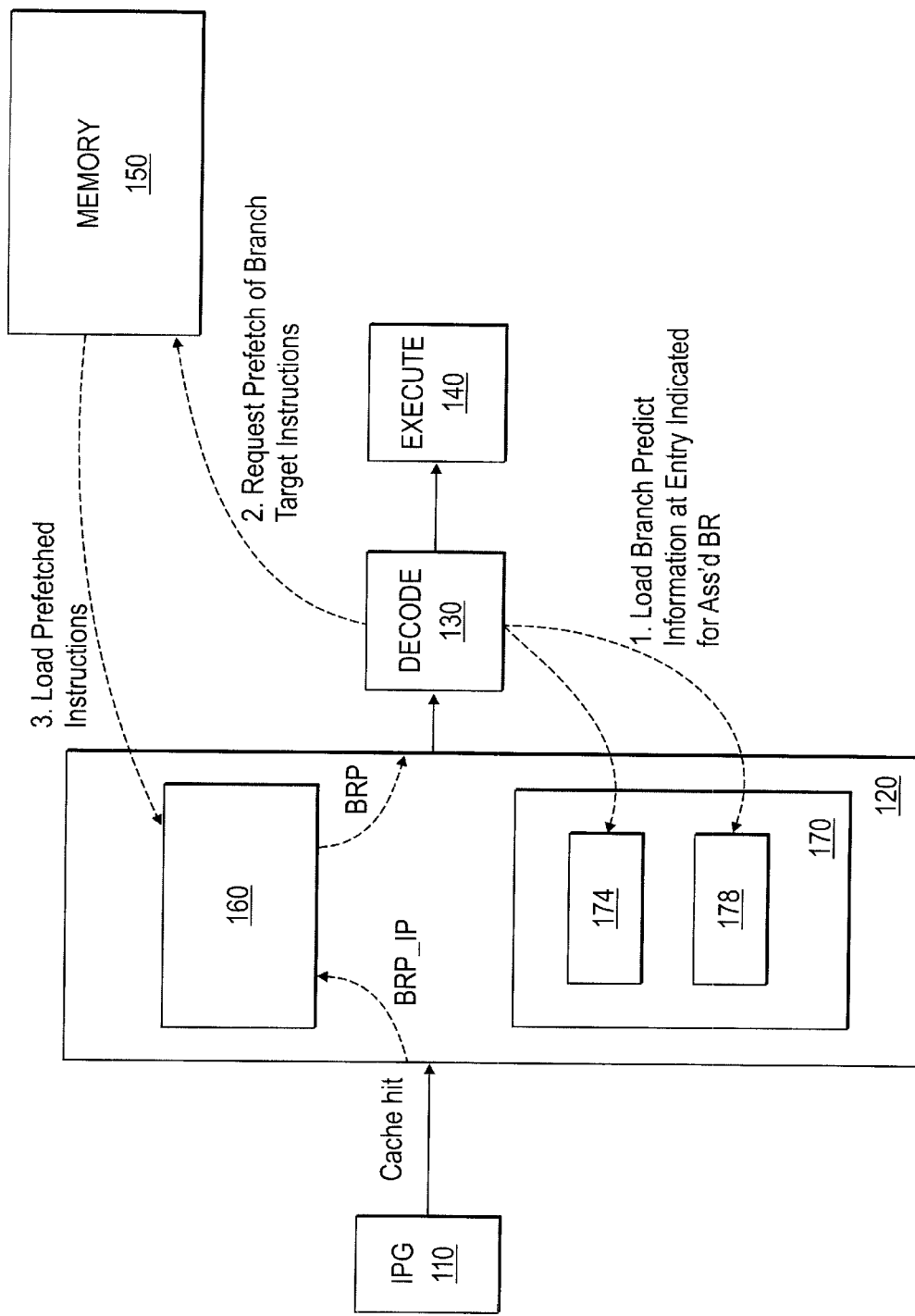
FIGS. 1A and 1B are block diagrams representing the operation of branch predict instructions and branch instructions for one embodiment of the present invention.

FIG. 1A is a block diagram representing a portion of a processor pipeline 100 and the operations triggered in pipeline 100 by a branch predict instruction in accordance with one embodiment of the present invention. Pipeline 100 includes an instruction pointer generator (IPG) 110, a fetch module 120, a decode module 130, and an execution system 140. A memory subsystem 150 for receiving data from and providing data to pipeline 100 is also shown. Fetch module 120 includes an instruction cache (I-cache) 160 and a branch prediction module 170. The disclosed embodiment of branch prediction module 170 includes a branch prediction table (BPT) 174 for storing predicted branch directions and a target address cache (TAC) 178 for storing predicted branch target addresses.

IPG 110 selects one or more instruction pointers (IPs) for processing on each clock cycle. Fetch module 120 uses the IP(s) to provide a corresponding instruction(s) to decode module 130. Ideally, instructions corresponding to selected IPs are available from I-cache 160 or through some other low latency buffer or bypass channel. Instructions from fetch module 120 are decoded in decode module 130 and directed to appropriate execution resources according to their instruction type. Branch instructions are directed to branch processing resources in execution system 140.

For IPs that correspond to branch instructions, branch prediction module 170 provides prediction information that anticipate changes in the instruction flow when the branch instruction is subsequently executed. For example, branch prediction system 170 provides a predicted branch direction and target address when a branch IP hits in BPT 174 and TAC 178, respectively, and I-cache 160 provides the instructions to which the branch target address points. The present invention ensures that this information is available from fetch module 120 when the branch IP is detected. In particular, it allows relatively small, fast storage structures such as BPT 174 and TAC 178 to be employed without reducing percentage of branch instructions for which predictions are provided (hit rate). As discussed below, the availability of static branch prediction information and the greater lead time for complex dynamic prediction algorithms improves the prediction accuracy of these structures.

In accordance with the present invention, a branch predict instruction (BRP) specifies branch hint information, including a predicted branch direction, a predicted target address, and a link to an associated branch instruction (BR). The BRP provides this branch hint information to prediction module 170 ahead of its associated BR. Targeting prediction information to branch instructions in the upcoming code stream allows smaller branch prediction structures to be used. Providing the prediction information early allows prefetches to be triggered and dynamic prediction algorithms to be initiated well before their results are needed. In the latter case, the greater lead time allows more complex dynamic prediction algorithms to be employed without increasing the response time of branch prediction module 170. For one embodiment of the invention, the BRP triggers delivery of the instructions indicated by the predicted target address to I-cache 160. Coupling the BRP to its associated BR allows branch prediction information and target instructions to be delivered to fetch module 120 on an as-needed basis for at least a portion of the BRs. For one embodiment, this coupling is provided by an indication of the IP of the associated BR.

Delivery of branch prediction information on an as-needed or just-in-time basis limits the amount of storage that must be provided by the branch prediction structures. The area saved allows these structures to be kept relatively small, increasing the speed with which they can access prediction information. Alternatively, some of the area savings may be used to implement a more accurate branch prediction algorithm.

As indicated in FIG. 1A, an IP representing a BRP (BRP_IP) is provided to fetch module 120, and the corresponding BRP is provided to decode module 120 from I-cache 160 or another low latency source. For one embodiment of the invention, processing the BRP triggers the following branch-related operations. (1) Branch hint information is provided to branch prediction module 170 for storage at an entry indicated by the IP of the associated BR. (2) A prefetch request is launched to memory subsystem 150 to retrieve branch target instructions, if the predicted branch direction is taken, and (3) memory subsystem 150 returns the branch target instructions to I-cache 160.

In sum, the BRP loads branch prediction module 170 with branch hint information at an entry indexed by its associated BR and initiates a prefetch request for branch target instructions. This increases the likelihood that branch hint information is available in branch prediction module 170 without increasing the size of BPT 174 or TAC 178. Moreover, a BR does not have to be decoded and executed to load BPS 170 with its hint information. BRP makes the branch hint information available early from fetch module 120 for the initial encounter with its associated BR. This improves performance where the program code does not have temporal locality and in other cases where dynamic prediction methods are ineffective.

Figure 1B:
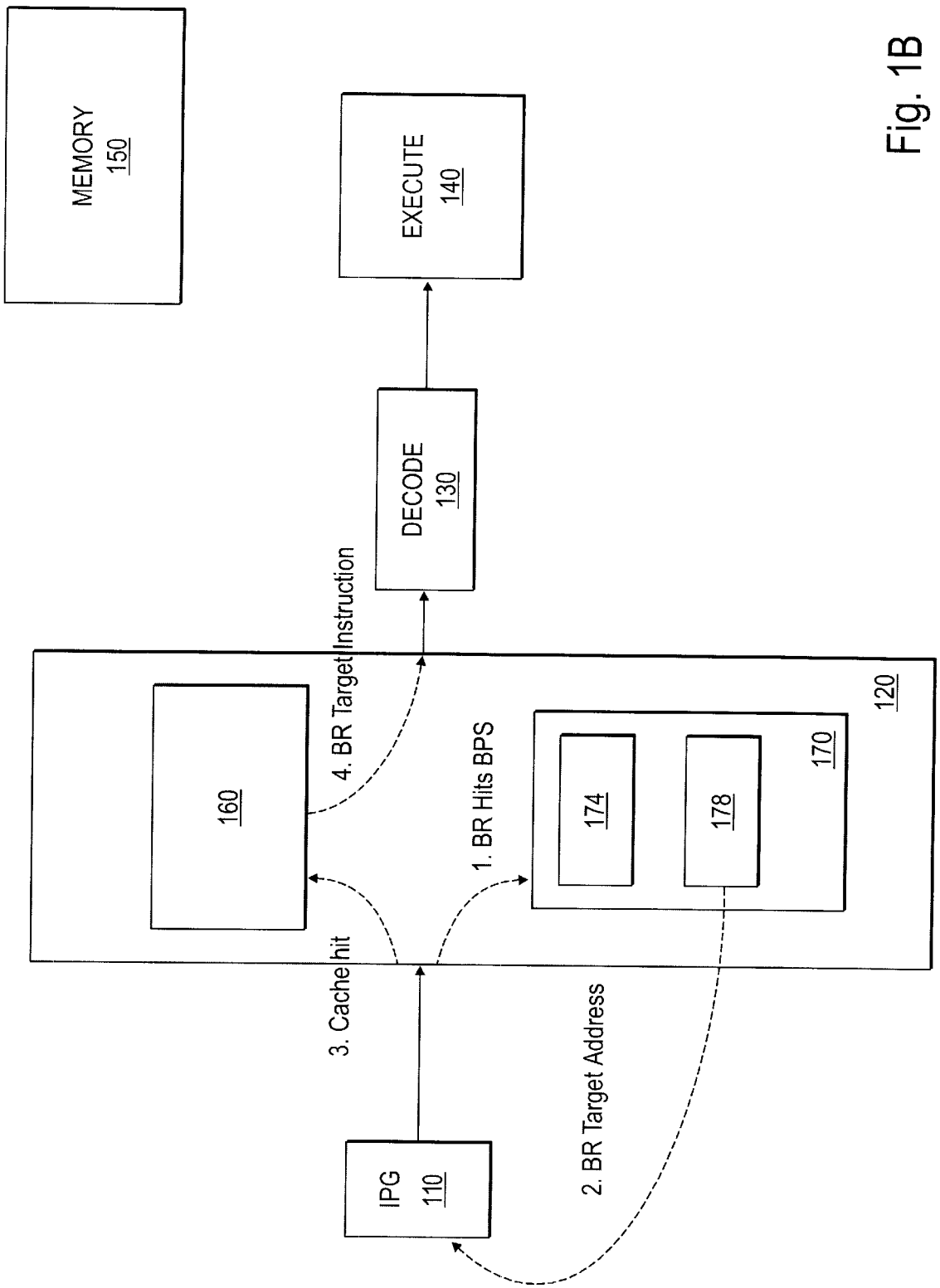

FIG. 1B is a block diagram of pipeline 100 indicating the operations triggered when the IP of the associated BR is detected. To simplify the figure, the branch IP hit in I-cache 160 and transfer of the branch instruction to decoder 130 are not indicated. (1) The branch IP hits in BPS 170. (2) TAC 178 provides the predicted branch target address IP to IPG 110, which couples it to fetch module 120 if the predicted branch direction provided by BPT 174 is TK. (3) The branch target address IP hits in I-cache 160, and (4) the branch target instructions are provided to decoder 130 from I-cache 160 (assuming the prefetch initiated by the branch predict instruction has had sufficient time to complete).

The amount of time necessary to fetch the branch target instructions for a predicted taken branch depends in part on the response time of BPT 174 and TAC 178. For one embodiment of the invention, these are designed to provide branch target instructions two clock cycles after the branch IP is provided to fetch module 120. This leaves a one clock cycle bubble in pipeline 100 between the (predicted TK) branch and its target instructions.

FIG. 2A represents the processing of a branch predict instruction for another embodiment processor pipeline 100, in which fetch module 120 includes a hierarchy of branch prediction structures. In particular, a small target address register (TAR) 172 is included in BPS 170 to store hint information for selected branch instructions. The smaller size of TAR 172 relative to TAC 178 (and BPT 174) allows it to provide branch target addresses to IPG 110 one clock cycle after the corresponding branch IP is provided to fetch module 120. This eliminates bubbles from pipeline 100 between the (predicted TK) branch and its target instructions. For one embodiment of pipeline 100, TAR 172 is reserved for selected branch instructions that are predicted TK, since the benefits of fast access are only realized when pipeline 100 is resteered. This also eliminates the need for a fast direction predict structure corresponding to BPT 174.

For this embodiment of the invention, BRP includes an importance hint to indicate whether the predicted target address should be stored in TAR 172 or TAC 178. Decoder 130 interprets the hint and directs the predicted branch target address accordingly. In the example, the BRP IP hits in I-cache 160 and the BRP is provided to decoder 130. Decoder 130 loads prediction information from the BRP into (1A) TAR 172 or (1B) BPT 174 and TAC 178, according to whether the hint bit is set. As in the embodiment of FIG. 1A, (2) a prefetch request is launched to memory 150, and (3) the prefetched branch target instructions are returned to I-cache 160.

Figure 2B:
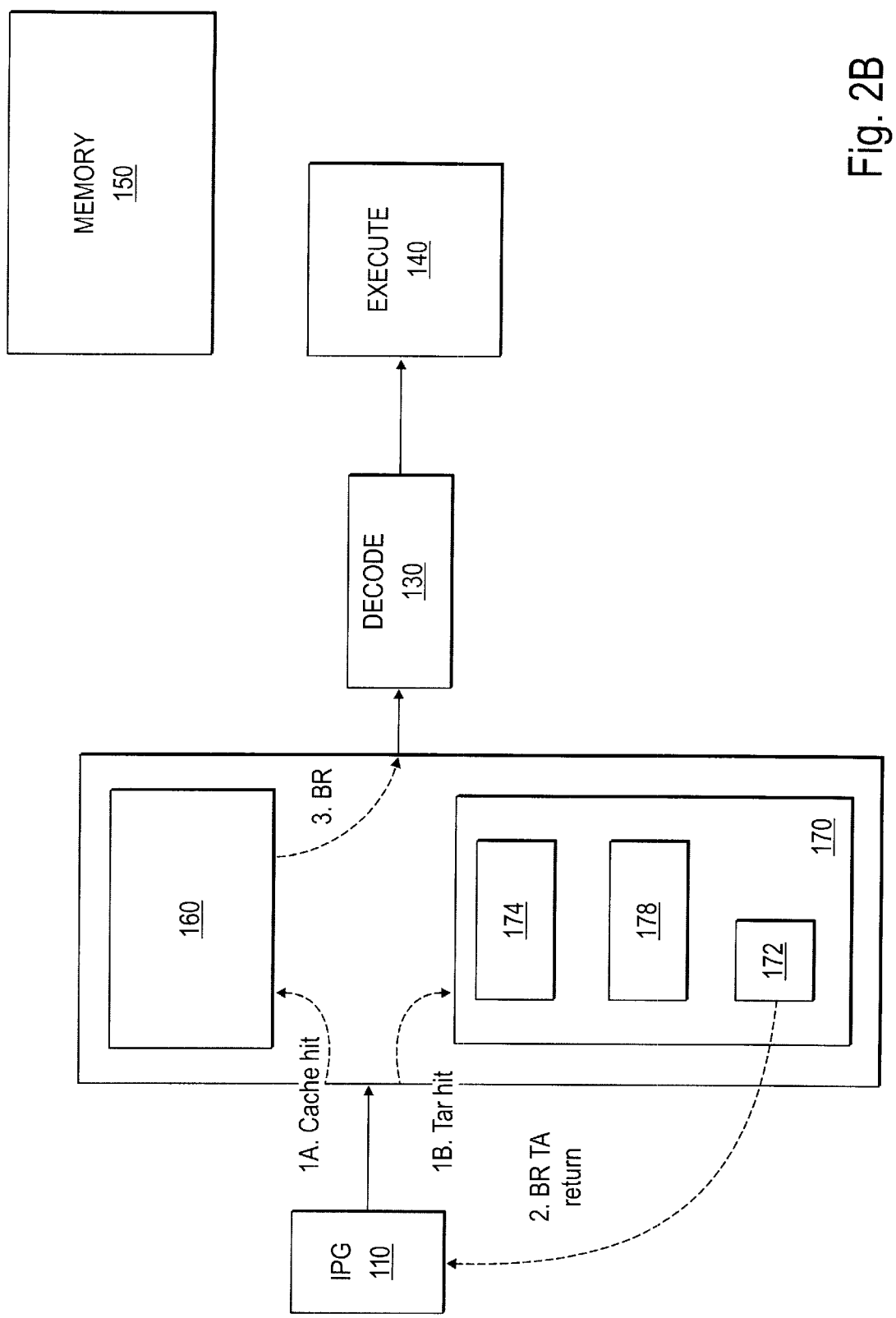

FIG. 2B represents the process that results when the branch predict information is stored in a BPS 170 having a hierarchy of branch prediction structures. In the disclosed example, the BR_IP hits in TAR 172 (1A) or TAC 178 (1B), and (2) the branch target address is returned to IPG 110 from the storage structure that holds the hit entry.

Figure 3:
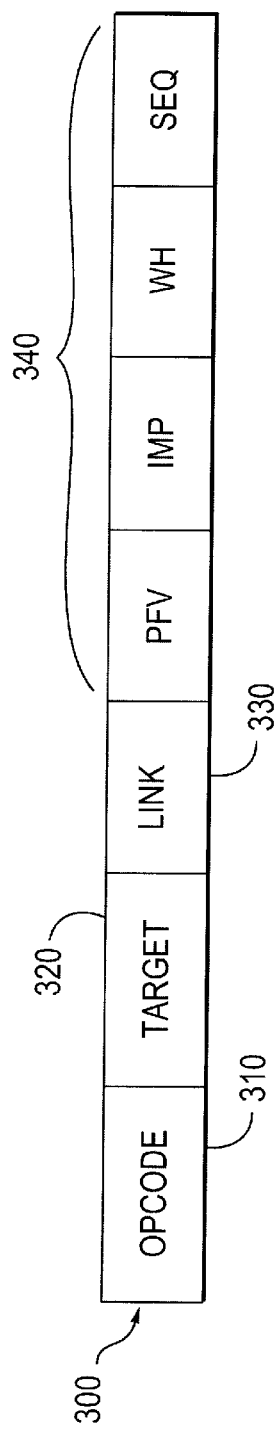
FIG. 3 is a block diagram representing one embodiment of a branch predict instruction in accordance with the present invention.

FIG. 3 is a block diagram of one embodiment of a BRP 300 in accordance with the present invention. The disclosed embodiment of BRP 300 includes an opcode field 310, a branch target field 320, a link field 330, and various hint fields 340. Opcode field 310 identifies the instruction as a BRP 300. Branch target field 320 indicates a target address to which control is transferred when the branch is resolved taken. Link field 330 indicates the BR that is associated with BRP 300. Hint field(s) 340 includes hint information that facilitates processing of the associated BR.

The data in branch target field 320 is typically provided as an IP or a portion of the IP for the first of the branch target instructions. This IP (or a portion of it) identifies the instructions targeted by a prefetched request that is triggered by BRP 300, and it is loaded into branch prediction system 170 to access the prefetched target instructions when the associated BR is detected. As discussed below, the branch target IP is stored at an entry of, e.g., TAC 178, that is tagged by the IP of the associated BR. For an indirect branch instruction, field 320 points to a register in which the branch target IP (or a portion of it) is stored. The processor reads the target address from the register and stores it at an entry tagged by the IP of the associated BR.

For one embodiment of the invention, link field 330 provides a displacement that may be added to the IP of BRP 300 to determine the IP of the associated BR. This IP provides the link between BRP 300 and its associated BR that allows branch prediction information to be prepositioned in branch prediction system 170 on an as-needed basis. Decoder 130 may use data from link field 330 and the BRP IP to determine the IP of the associated BR. For one embodiment, link field 330 specifies a nine bit offset that is combined with the IP of BRP 300 to indicate the IP of the associated BR. Decoder 130 stores the branch prediction data in an entry of, e.g., BPT 174 or TAC 178, identified through the associated BR IP (or IP portion). BRP 300 is scheduled to make the branch predict information available by the time the IP of the associated BR reaches fetch module 120. This avoids the need wait for decoder 130 to extract the information when the branch instruction is first executed.

For another embodiment, link field 330 may store a tag made up of some subset of bits from the address of the branch instruction. When a branch is encountered, the corresponding subset of bits from the instruction address are CAMMED to determine whether a match is present. Persons skilled in the art will recognized that other methods are available to encode a link between the BRP with its associated BR.

Hint field 340 may include hint information indicating the importance of the BR, how it should be predicted, and whether and how a prefetch request should be implemented. For the embodiment of pipeline 100 in FIG. 2A, hint field 340 includes an importance hint (IMP) that is set if the branch target IP provided by BRP 300 is to be written to TAR 152. The importance hint allows branch prediction resources to be allocated to different BRs according to their expected impact on performance.

A "whether" hint (WH) in hint field 340 may be used to indicate how the associated BR should be predicted. For example, the "whether" hint may indicate that the associated BR should be predicted on the basis of static data available at compile time, or that dynamic data accumulated during execution be used to predict the associated BR. Dynamic data includes the resolved branch direction and target address for the executed BR.

For one embodiment of the invention, the "whether" hint indicates a type for a loop branch instruction. For example, counted loops and top loops are loop structures that terminate with a loop branch instruction. The loop is repeated each time the loop branch is resolved TK, and it terminates when the loop branch is resolved NT. Typically, a counted/top loop is iterated repeatedly before it is terminated. During execution of the loop, the counted/top loop branch is resolved TK for multiple iterations. It is resolved NT on the final iteration, which exits the loop. Exit loops are loop structures in which the loop branch is at a location other than the end of the loop. The loop is repeated each time the loop branch is resolved NT, and it terminates when the loop branch is resolved TK. A typical exit loop is also iterated repeatedly before it is terminated. Encounters with the exit loop branch produces a sequence of NT resolutions followed by a TK resolution that terminates the loop. In each case, the likelihood that a loop branch will be resolved taken depends on the type of loop. Indicating the loop type in the "whether" hint allows the loop branch to be more accurately predicted.

For one embodiment of the invention, two prefetch related hints are provided in hint field 340. One prefetch related hint, the trace vector (PFV), allows prefetch requests to be canceled if the associated BR no longer appears to be on the processor's execution path. Another prefetch hint, the sequential fetch hint (SEQ), allows a series of fetches to be triggered by a single prefetch request when the branch target instructions are too numerous to transferred in a single fetch.

The trace vector represents the execution path (or a portion of it) between BRP 300 and its associated BR. For one embodiment, the trace vector may represent the execution path by indicating the branch directions of intervening BRs that are necessary to reach the associated BR from its BRP. These directions are compared with the resolved branch directions of the intervening BRs. When the represented and resolved branch directions disagree, the processor's execution path will miss the associated BR, and the prefetch request triggered by BRP 300 is canceled. For one embodiment, the prefetch trace vector is 3 bits wide, and specifies the TK/NT/DC status of the first two intervening BRs that follow the BRP. Here, DC means "don't care", i.e. the associated branch instruction may be reached, independent of whether the intervening branch instruction is TK or NT.

For one embodiment of the invention, the sequential fetch hint is a single bit field. When the bit is set, a single prefetch request triggers multiple fetches to sequential blocks of branch target instructions. As noted above, this is useful when the branch target instruction is too big to be retrieved in a single fetch operation. A prefetch request returns only one block of branch target instruction when the sequential fetch hint is not set.

Figure 4:
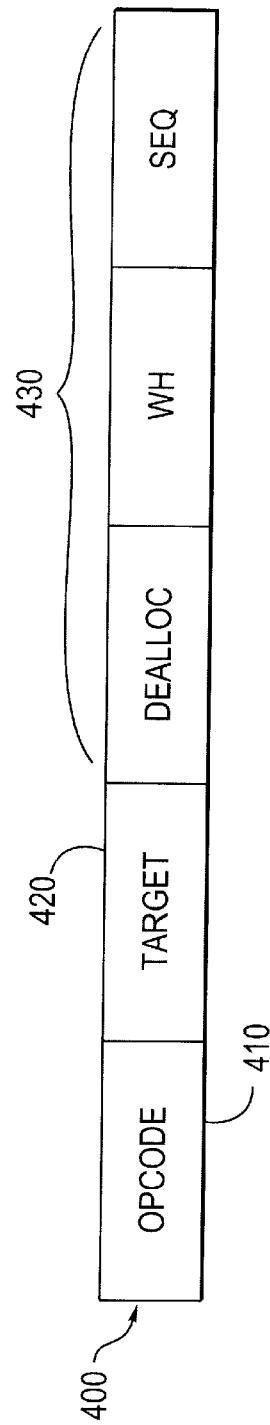
FIG. 4 is a block diagram representing one embodiment of a branch instruction in accordance with the present invention.

FIG. 4 is a block diagram of one embodiment of a BR 400 in accordance with the present invention. The disclosed embodiment of BR 400 includes an opcode field 410, a branch target field 420, and a branch hint field 430. Opcode field 410 identifies BR 400 as a branch instruction of a specific type, e.g. loop, indirect, IP-relative, call, return, etc. Branch target field 420 identifies the instruction(s) to which the branch transfers control of the processor when the branch is TK. Field 420 typically includes an IP or portion of an IP for the branch target instruction. For an indirect branch instruction, field 420 points to a register in which the IP of the branch target instruction is stored. Hint field 430 may include "whether" and "sequential fetch" hints similar to those in branch predict instruction 300.

Hint field 430 may also include a "deallocation" hint to better manage branch prediction resources. As noted above, conventional branch prediction systems employ large storage structures in their branch prediction systems to track branch prediction histories for recently executed branch instructions. The deallocation hint of the present invention, allows branch prediction system 170 to ignore branch history data for selected BRs. For example, if a BR is not likely to be encountered again any time soon, the deallocation hint may be used to keep the corresponding branch history data out of BPT 174, TAC 178, and TAR 172 (if present). This can be particularly important, where smaller branch prediction structures are employed to speed up the pipeline resteer process. For one embodiment of the invention, if the "deallocation" bit is set, branch prediction system 170 is not updated with branch information when BR 400 is executed. If the "deallocation" bit is not set, branch prediction system 170 is updated to reflect the resolution of BR 400.

Figure 5:
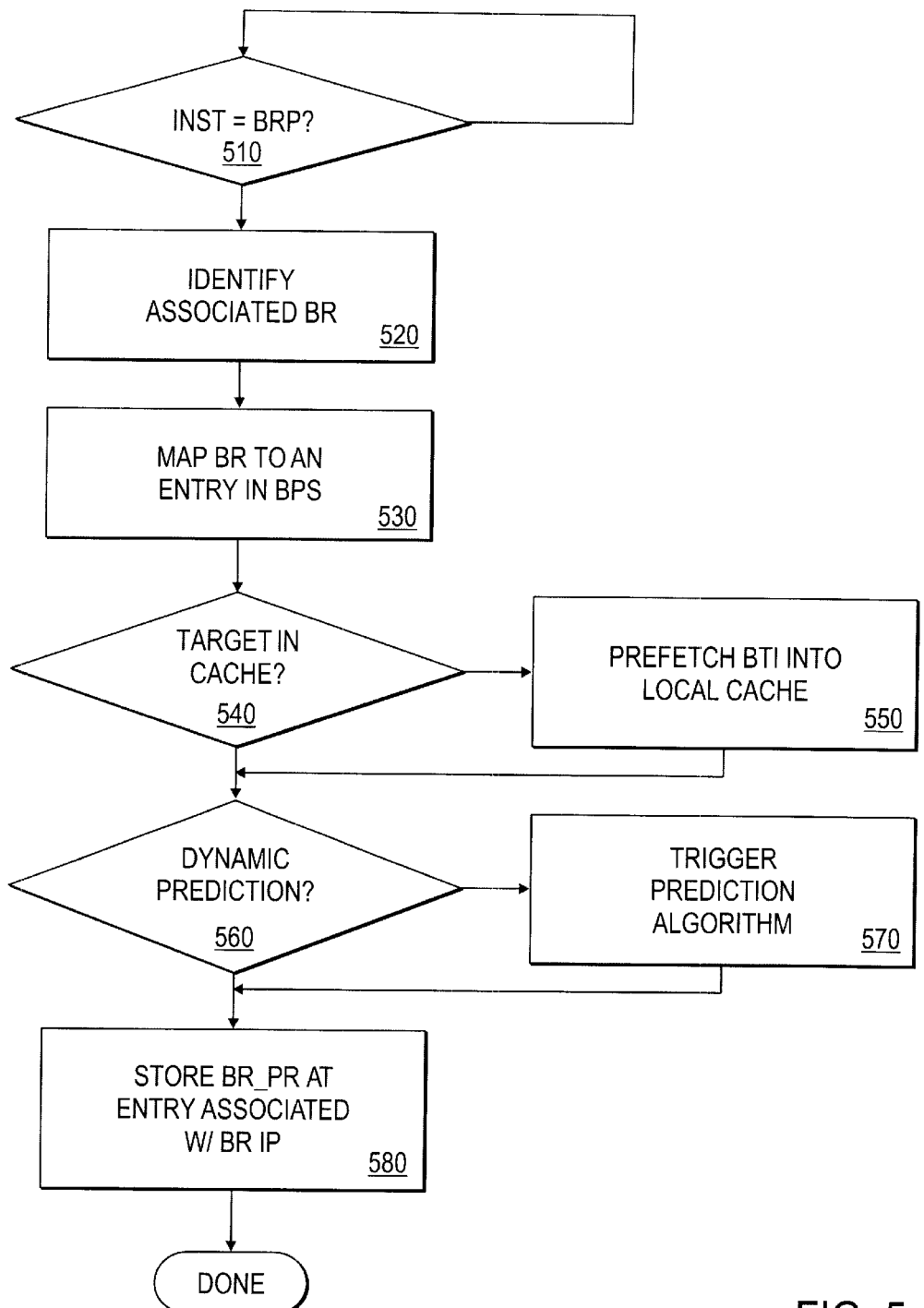
FIG. 5 is a flow chart representing one embodiment of a method for managing branch prediction information in accordance with the present invention.

FIG. 5 is a flowchart representing a method in accordance with the present invention for managing branch prediction resources using a branch predict instruction. Method 500 is initiated when a BRP is detected 510. Following detection 510, a BR associated with the branch predict instruction is identified 520. For one embodiment of the invention, the associated BR is identified by an offset in the BRP, e.g. in link field 320, which is added to the BRP IP to provide an IP for the associated BR. The BR IP (or a portion of it) is mapped 530 to an entry in branch prediction system 170 for storing branch prediction (BR_PR) information. The BR_PR information typically includes the branch target address (or a portion thereof) to which control of the processor is transferred when the branch is taken and a predicted branch direction. If the associated branch is to be predicted dynamically, the predicted branch direction may be provided by an algorithm implemented by the branch prediction system.

For one embodiment of the invention, a local cache is checked 540 for an instruction at the branch target address, and a prefetch request is triggered 550 (BTI), if it is not available in the cache. The prefetch increases the probability that the branch target instructions BTI pointed to by the branch target address (pointer) is available in, e.g., I-cache 160 when the associated branch instruction is encountered.

For another embodiment of the invention, a hint that indicates whether the associated branch should be predicted statically or dynamically is checked 560. If the branch is to be predicted dynamically 550, the prediction algorithm is initiated 570. By initiating the prediction algorithm in response to the branch predict instruction, the algorithm has more time to complete before the branch instruction arrives.

The branch prediction data is stored 580 in the entry in BPS 170 associated with the BR IP. For one embodiment of method 500, the branch prediction system includes a hierarchy of storage structures for the prediction information provided by the BRP. For this embodiment, a hint bit in the BRP indicates which storage structure should receive the prediction information. An entry in the selected storage structure is indicated by the IP of the BR associated with the BRP.

The operations of method 500 are shown in a particular order, but this order is not necessary to implement the invention. For example, dynamic branch prediction, prefetch initiation, and storing may be done concurrently or in a different order than is illustrated.

Figure 6:
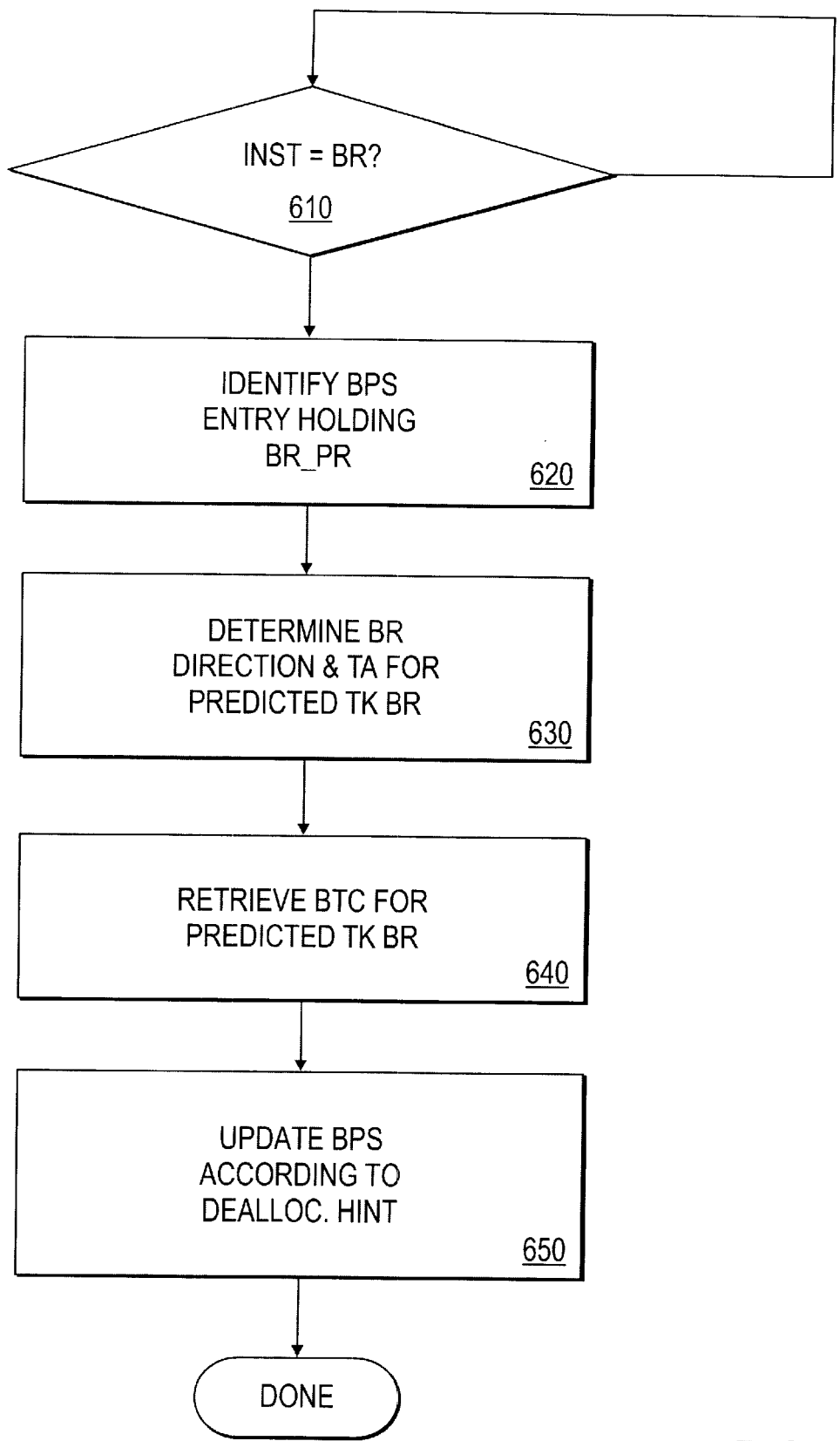
FIG. 6 is a flow chart representing one embodiment of a method for processing branch prediction information stored in accordance with the method of FIG. 5.

FIG. 6 is a flow chart representing one embodiment of a method for processing a BR in accordance with the present invention. When a BR is detected 610, the IP associated with the BR is used to identify 620 an entry in BPS 170 at which corresponding BR_PR information is stored. The BR_PR information (static or dynamic) indicates 630 whether the BR is predicted TK and the target address to which control is transferred when the BR is TK. When the BR is predicted TK, branch target code is retrieved 640 from a cache entry indicated by the BR target address. When the BR is decoded, a deallocation hint indicates 650 whether the entry in BPS 170 should be preserved or overwritten by new BR PR information.

There has thus been provided a method for processing branch operations that makes fast, efficient use of branch prediction structures. A branch predict instruction includes target address and predicted branch direction information for an associated branch instruction indicated by the branch predict instruction. The branch instruction indicated by the branch predict instruction points to an entry or entries in a branch prediction system at which the predicted target address and branch direction are stored. When the associated branch instruction is subsequently detected, the corresponding entry in the BPS may be identified and the branch prediction information retrieved for processing.

While the present invention has been illustrated using specific embodiments, it is not limited to these embodiments. Rather, the invention is represented by the spirit and scope of the appended claims.

What is claimed is:

1. A method for processing branch operations comprising:
    detecting a branch predict instruction that indicates a target address and a branch instruction address associated with the target address; and
    storing the target address at an entry of a branch prediction structure indicated by the associated branch instruction address.

2. The method of claim 1, further comprising:
    detecting a branch instruction indicated by the associated branch instruction address; and
    retrieving the target address.

3. The method of claim 2 wherein retrieving the target address comprises:
    determining a storage index from a portion of the address of the branch instruction; and
    retrieving the target address at the storage index.

4. The method of claim 1 wherein the associated branch instruction address is indicated by an offset from an address of the predict instruction.

5. A method for providing prediction information for branch operations comprising:
    generating a branch instruction characterized by a branch address and a branch target address;
    generating a predict instruction to indicate the branch target address for the branch instruction, the predict instruction being linked to the branch instruction through an indication of the branch address; and
    scheduling the predict instruction for processing ahead of the branch instruction;
    wherein generating a predict instruction comprises,
    indicating the branch target address in a first field of the predict instruction; and
    indicating the branch instruction address in a second field of the predict instruction.

6. The method of claim 5, comprising indicating a branch resolution hint in a third field of the predict instruction.

7. The method of claim 5 wherein the predict instruction is linked to the branch instruction through an offset between an address of the predict instruction and the branch instruction address, and scheduling comprises scheduling the branch predict instruction ahead of the branch instruction by an amount indicated by the offset.

8. A machine readable medium on which are stored instructions that may be executed by a processor to implement a branch operation, the instructions comprising:
    a branch instruction characterized by a branch instruction address and a branch target address; and
    a predict instruction that indicates the branch target address and the branch instruction address of the branch instruction, the predict instruction being scheduled ahead of the branch instruction to provide branch prediction information for the branch instruction when implemented by the processor.

9. The machine readable medium of claim 8, wherein the predict instruction is characterized by a predict instruction address and is linked to the branch instruction through an offset between the predict instruction address and the branch instruction address.

10. The machine readable medium of claim 8, wherein the branch predict instruction causes the branch target address to be stored in a location indexed by a portion of the branch instruction address when executed by the processor.

11. The machine readable medium of claim 10, wherein the branch predict instruction includes branch hint information that is stored in a location indexed by a portion of the branch instruction address when executed by the processor.

12. A method for implementing a branch operation comprising:
    detecting a branch prediction instruction;

identifying an associated branch instruction from a link provided in the branch predict instruction; and determining a predicted branch direction according to a hint provided in the branch predict instruction.

13. The method of claim 12, further comprising storing a target address specified in the branch predict instruction at a storage location indicated by the associated branch instruction.

14. The method of claim 12, wherein determining the predicted branch direction comprises:

initiating a dynamic branch prediction algorithm when the hint is in a first state; and identifying a static branch prediction in the branch predict instruction otherwise.

15. The method of claim 13, further comprising storing the target address and a predicted branch direction at a location indicated by the associated branch instruction.

* * * * *